United States Patent [19]

Levie

[11] Patent Number: 4,839,965

[45] Date of Patent: Jun. 20, 1989

[54] SKIMMER/SEPARATION LADLE

[75] Inventor: Mark W. Levie, New York, N.Y.

[73] Assignee: LK Mfg., West Babylon, N.Y.

[21] Appl. No.: 176,858

[22] Filed: Apr. 4, 1988

Related U.S. Application Data

[63] Continuation of Ser. No. 914,866, Oct. 3, 1986, abandoned.

[51] Int. Cl.$^4$ ............................................. A47J 43/28
[52] U.S. Cl. ..................................................... 30/324
[58] Field of Search ................... 30/324, 326; 99/316, 99/321, 499; 210/464, 466, 469; 426/77, 79, 82; D7/47, 99, 104

[56] References Cited

U.S. PATENT DOCUMENTS

| | | | |
|---|---|---|---|
| 402,620 | 5/1889 | Schue | 210/464 |
| 1,165,376 | 12/1915 | Adkins | 99/316 |
| 1,654,980 | 1/1928 | LeDuc | D7/47 X |
| 2,198,059 | 4/1940 | Pistorius | 210/469 |
| 3,331,414 | 7/1967 | Dillon et al. | D7/47 X |
| 4,524,517 | 6/1985 | Rupe | 30/324 |

FOREIGN PATENT DOCUMENTS 2170 of 1887 United Kingdom .................. 99/316

Primary Examiner—Frank T. Yost
Assistant Examiner—Michael D. Folkerts
Attorney, Agent, or Firm—Kane, Dalsimer, Sullivan, Kurucz, Levy, Eisele and Richard

[57] ABSTRACT

A skimmer/separator ladle has a handle, a spoon integral with the handle; with the spoon having a spout at one end and a container section at the other end and wherein there is provided a separator gate vertically and removably mounted in the spoon between the spout and the container section. The gate has a concave bottom so as to define a liquid passage between it and the bottom of the ladle.

10 Claims, 4 Drawing Sheets

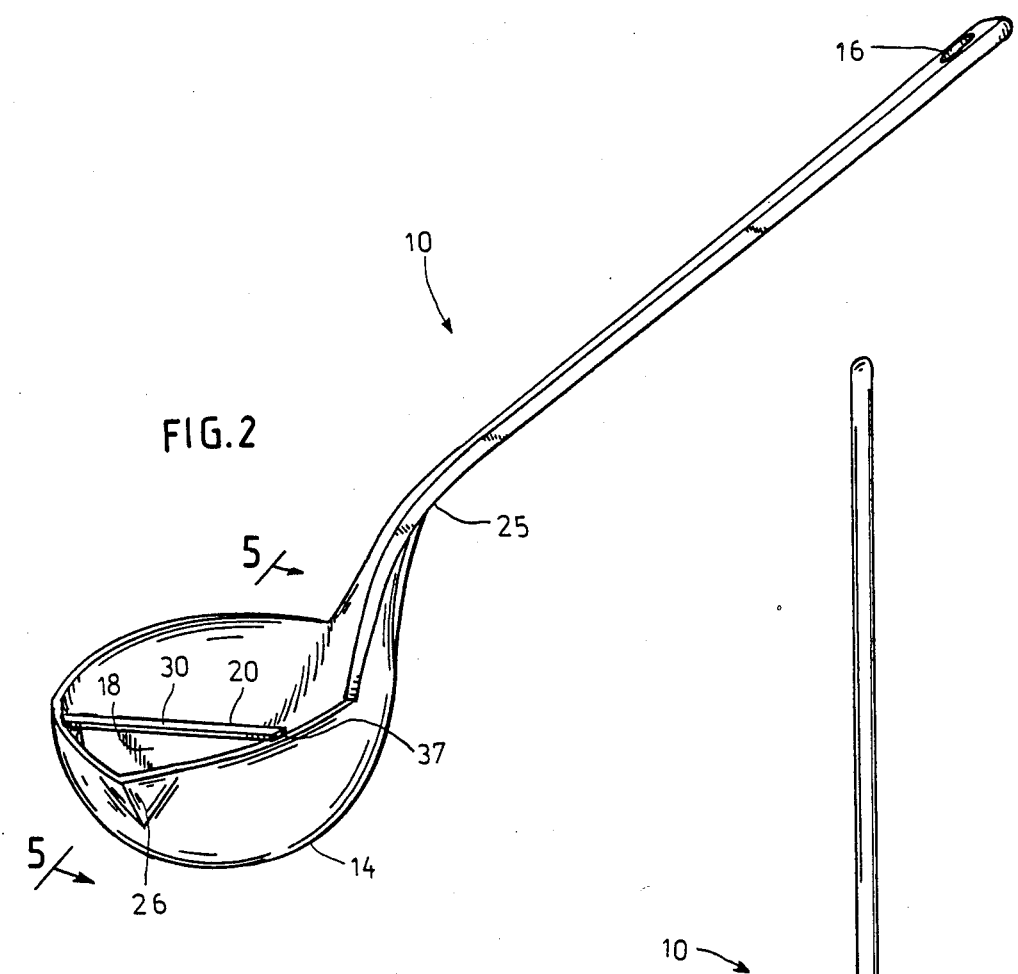
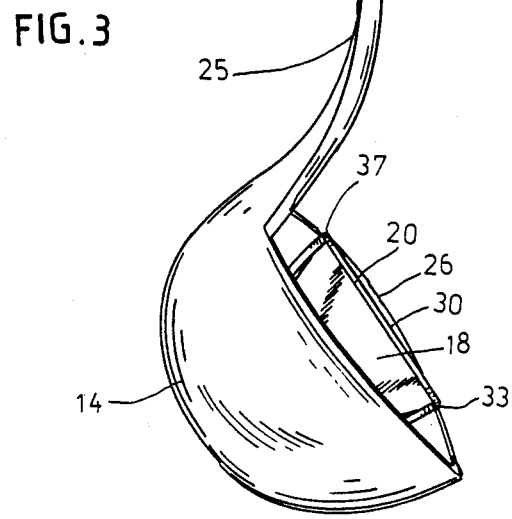
FIG. 2
FIG. 3

SKIMMER/SEPARATION LADLE

This is a continuation of co-pending application Ser. No. 914,866, filed on Oct. 3, 1986, now abandoned.

FIELD OF THE INVENTION

This invention relates generally to a versatile skimmer and ladle which is useful for skimming gravy or soup, separating eggs, serving punch, pouring batter, serving soup and as a regular ladle. These operations are made possible by the provision in the ladle of a removable gate of novel design.

OBJECTS AND SUMMARY OF THE INVENTION

One object of the present invention is to provide an improved device useful as a skimmer and separator in the culinary arts.

Another object of the invention is to provide a device of the character described, a gate removable fitting in the ladle.

With the above and other incidental objects in view as will more thoroughly appear in the description below, the invention intended to be protected by Letters Patent consists of the features of construction, the parts and combinations thereof and the mode of operation as hereinafter described or illustrated in the accompanying drawing or their equivalents.

BRIEF DESCRIPTION OF THE DRAWINGS

Referring to the accompanying drawings wherein one preferred embodiment is shown and the same reference characters refer to the same or like parts:

FIG. 2 is the same as FIG. 1 but with the separator gate in the front part of the ladle;

FIG. 3 is a rear view of the ladle with the separator gate therein; and,

DETAILED DESCRIPTION OF A PREFERRED EMBODIMENT

Figure 1:
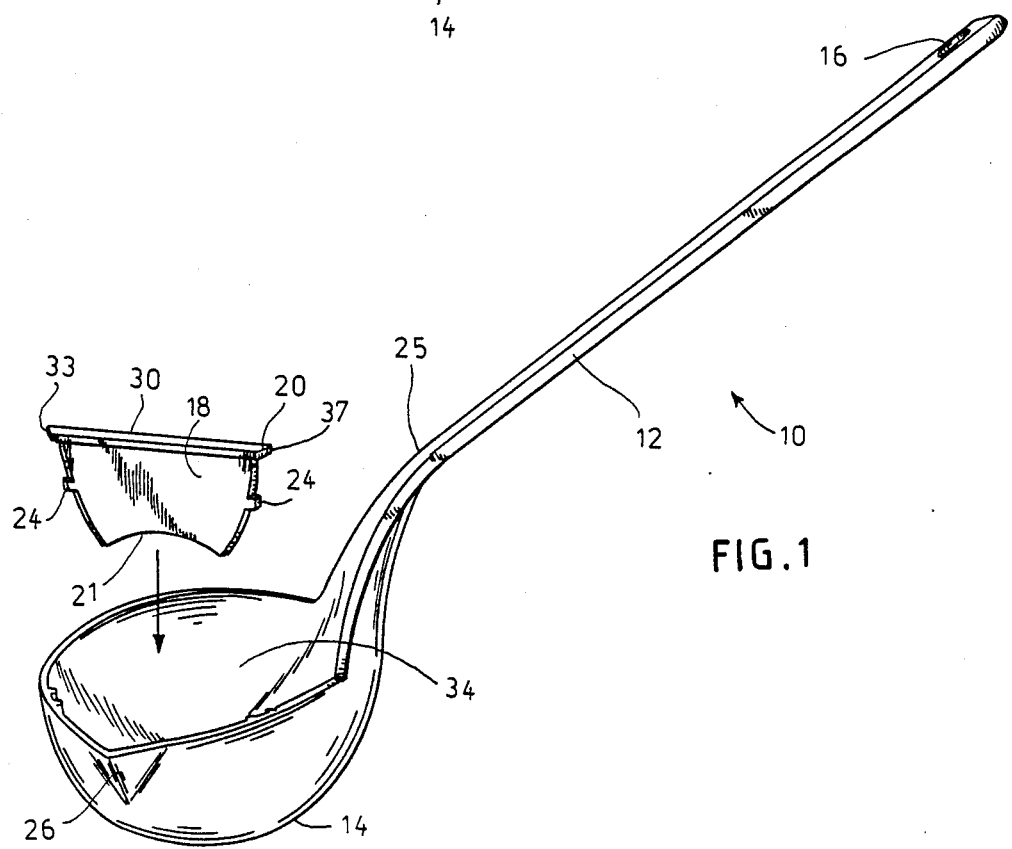
FIG. 1 is a perspective view of the ladle showing its separator gate removed.

Referring descriptively to FIG. 1, the ladle of the invention 10 includes a handle 12 integral with the spoon-shaped or semi-ovoid container member 14, which may possess any desired shape.

The ladle of the invention can be metallic or molded from any desired semi-hard plastic material such as high density polyethylene, "LEXAN" polycarbonate plastic or the like. In its upper part, the handle 12 has a suspending hole 16. The handle 12 terminates in the bowl 14 as shown in greater detail in FIG. 1 and FIG. 3. The handle 12 can be straight, or have a curved intermediate section 25.

Figure 5:
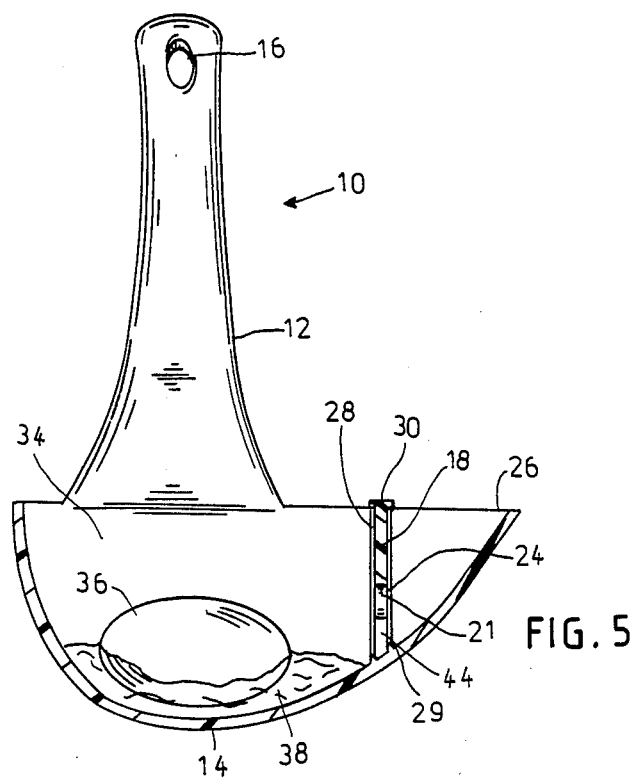
FIGS. 5 and 6 are detailed views of the invention.
Figure 6:
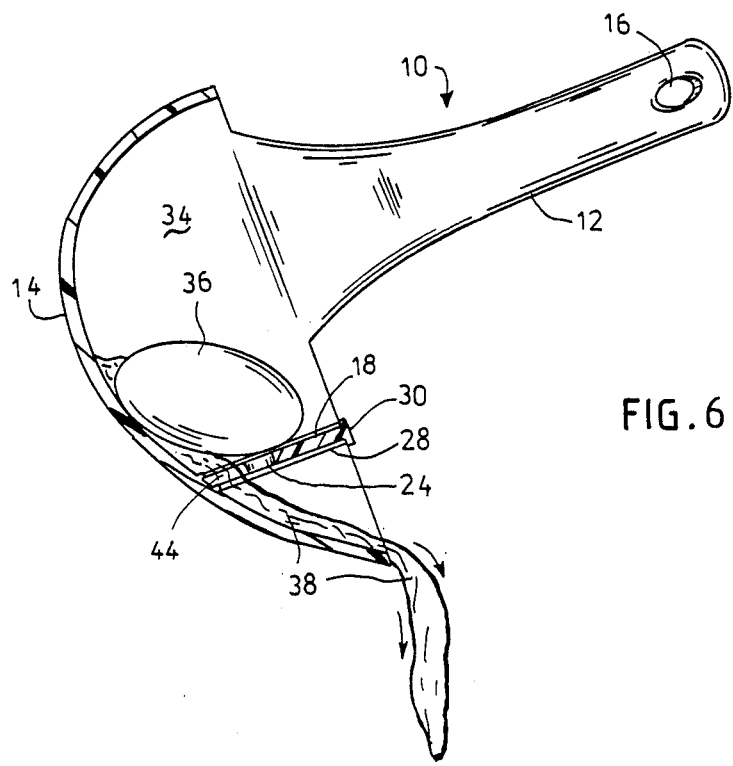

The actual use of the ladle is shown in FIG. 5 which is a cross-sectional view taken along line 5—5 of FIG. 2 and in FIG. 6 which is a cross-sectional view of the ladle in use.

As shown in FIG. 1, the ladle has a separator gate 18 which includes an upper rim 20 and a rounded bottom 22 with horizontally extending tabs 24. This gate is made of the same material preferably as the rest of the device. Bowl 14 has a pouring spout 26 which is located in front of the gate 18. The tabs 24 serve as detents.

As shown in greater detail in FIGS. 5 and 5, a pair of semicircular tracts 28 are provided near the spout 26. These tracts received the sides of gate 18 and in particular, the tabs 24. The upper rim 30 of the gate is wider than the body of the gate so as to permit grasping thereof. As shown, the lower part 21 of gate 18 is concave so as to allow passage of material between the body 34 of the ladle and the spout 26. FIGS. 5 and 6 show how the egg 36 is separated from the egg yolk 38 which passes in space 22 under the gate 18 to be poured out from spout 26, as depicted by the arrows in FIG. 6.

When desired, the separate gate 18 is inserted in track or tracks 28 and is pushed down therein until the detente 24 snap into place in the track or tracks 28. The gate 18 can be removed by pulling it upward. It will be appreciated that there can be provided a single track which espouses the inner curved surface of the device, or, two such tracks which taper downwardly along the inside surface of the ladle and whose inner extremities practically merge in slightly spaced points in the bottom surface 29 of the body 34 of the ladle.

Figure 4:
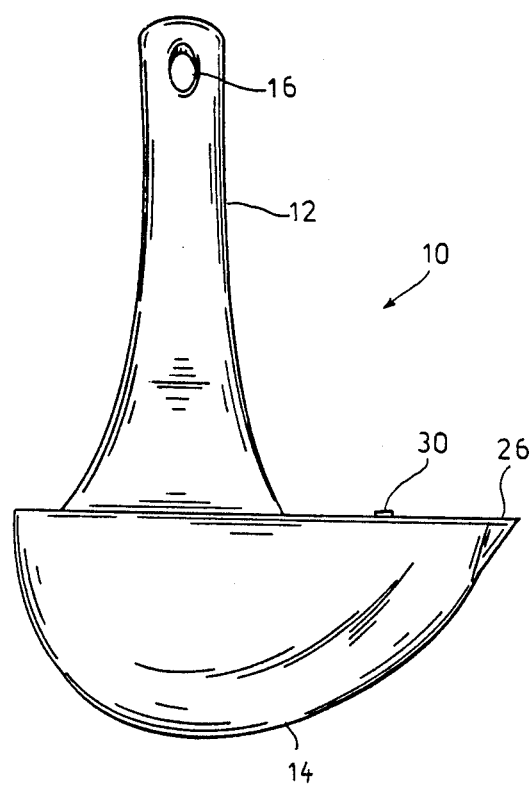
FIG. 4 is a front elevation of the ladle according to the invention.

As shown in the drawing, the axes of the bowl body 34, and of the handle 12 are at substantially 90 degrees to one another. The flared out lower end of the handle is formed closer to the rear surface 35 (FIG. 4) of the bowl than to the spout 26. This arrangement facilitated pouring and handling of the device. For better stability, the upper rim 30 (FIG. 1) projects outwardly at 33 and 37 for a distance substantially equal to the width of the container body 34's rim.

With the separator gate removed, the article of the invention is uniquely useful for pouring from punch bowls, for pouring pancake mixes and batters, gravy soups and for all normal uses of a ladle. With the gate in place, the ice cubes may be separated from punch to avoid spilling and splashing and splattering.

With the gate in place, the article of this invention is useful for the separation of eggs, for skimming soups and skimming gravies.

In a successful application of the invention, the ladle 10 possessed a handle which was about 7 inches long from end to end. From end to tip, the bowl measured about 3¾ inches and was 1¾ inches at its deepest part. The gate was about 1⅞ inches at its upper rim and was about 1⅛ inches deep.

Figure 7:
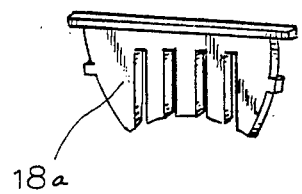
FIGS. 7-9 illustrate other forms of gates contemplated by the invention.
Figure 8:
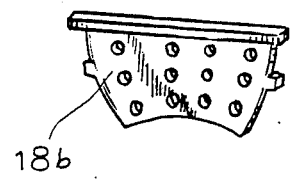
Figure 9:
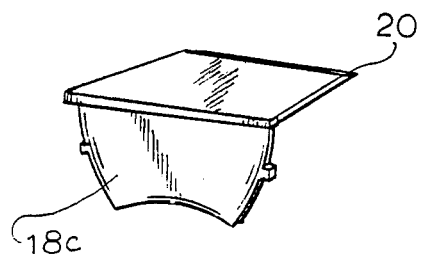

Gates of various construction are adaptable to the present invention. In this regard FIGS. 7 and 9 illustrate gates 18a and 18b useful in performing a straining operation such as a fruit cocktail or salad. The gate 18c of FIG. 9 will possess a larger upper rim 20c serving as a dam to minimize spilling when performing a skimming or separating operation.

The device of the invention has been thoroughly under actual use conditions and has been found to be completely successful for the above-stated objects of the invention. Therefore, the several aforementioned advantages and features of this invention are most effectively attained. Although a single, somewhat preferred embodiment of the invention has been disclosed and described herein, it should be understood that this invention is in no sense limited thereto and that its scope is to be determined, only by the language of the appended claims.

What is claimed is:

1. In a skimmer/separator ladle comprising:
a handle;

a bowl having a spout section at one end thereof and a container section at the other end thereof, the improvement consisting of:

a separator gate removably mounted in said bowl between said spout and said container section and coupling means for removably mounting said gate on said bowl, said gate defining a passage with the bottom of said bowl for liquids from the container section to said spout section, said bowl having at least one track and said gate is received therein, each track being semicircular, the gate including semicircular sides that mate with each of the semicircular tracks.

2. The ladle of claim 1 wherein said handle has a hole in the upper end thereof.

3. The ladle of claim 1 including a separate downwardly curved intermediate section connecting said bowl with said handle.

4. The ladle of claim 1 wherein the same is generally ovoid-shaped.

5. The improvement of claim 1 wherein, the gate coupling means has locking means for removably securing same in said bowl.

6. The improvement of claim 5 wherein, said locking means is a pair of detent tabs extending horizontally from said gate and adapted to engage the inside surface of said bowl.

7. The improvement of claim 1, wherein the gate includes an upper rim that is wider than the body of the gate so as to permit grasping thereof.

8. The improvement of claim 8 wherein the gate is provided with an upper dam for reducing spillage.

9. In a skimmer/separator ladle comprising:

a handle;

a bowl having a spout section at one end thereof and a container section at the other end thereof, the improvement consisting of:

a separator gate removably mounted in said bowl between said spout and said container section and coupling means for removably mounting said gate on said bowl, said gate defining a passage with the bottom of said bowl for liquids from the container section to said spout section, the gate coupling means having locking means for removably securing same in said bowl, said locking means being a pair of detent tabs extending horizontally from said gate and adapted to engage the inside surface of said bowl.

10. The improvement of claim 9 wherein said gate has a concave bottom defining with the bottom of said bowl a passage for liquids from said container section to said spout section.

* * * * *